(12) United States Patent
Cheston et al.

(10) Patent No.: US 6,591,320 B1
(45) Date of Patent: Jul. 8, 2003

(54) METHOD AND SYSTEM FOR SELECTIVE DISABLEMENT OF EXPANSION BUS SLOTS IN A MULTIBUS DATA PROCESSING SYSTEM

(75) Inventors: Richard Wayne Cheston, Morrisville, NC (US); Daryl Carvis Cromer, Cary, NC (US); Dhruv Manmohandas Desai, Cary, NC (US); Jan Michael Janick, Research Triangle Park, NC (US); Howard Jeffrey Locker, Cary, NC (US); Ernest Nelson Mandese, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/075,304

(22) Filed: Jun. 1, 1999

(51) Int. Cl.7 .............................................. G06F 13/00
(52) U.S. Cl. ........................ 710/104; 710/300; 710/316
(58) Field of Search ................................. 710/104, 107, 710/300–304, 316, 315; 361/683; 709/210, 200

(56) References Cited

U.S. PATENT DOCUMENTS

| | | | | |
|---|---|---|---|---|
| 5,109,517 A | * | 4/1992 | Houda et al. ............... 709/200 |
| 5,581,693 A | * | 12/1996 | Pecone ....................... 361/683 |
| 5,596,728 A | * | 1/1997 | Belmont ..................... 361/683 |
| 5,778,199 A | * | 7/1998 | Wanner et al. .............. 709/216 |

FOREIGN PATENT DOCUMENTS

| | | |
|---|---|---|
| JP | 6-200383 | 3/1996 |
| JP | 8-186216 | 3/1997 |
| JP | 9-237140 | 9/1997 |

* cited by examiner

Primary Examiner—Peter Wong
Assistant Examiner—Justin King
(74) Attorney, Agent, or Firm—George E. Grosser; Bracewell & Patterson, L.L.P.

(57) ABSTRACT

A method and system for eliminating peripheral device conflicts in a multibus data-processing system which includes a Peripheral Component Interconnect (PCI) plus having multiple slots for interconnecting peripheral devices in an automatically derived configuration and an Industry Standard Architecture (ISA) bus having multiple slots for interconnecting peripheral devices in a user-selected configuration. Each slot included within the ISA bus includes a reset line for temporarily disabling an associated slot in response to an application of electrical power to the data-processing system in order to prevent power transition problems. In response to an existing or potential device conflict brought about by a user-selected configuration, a control signal is selectively applied to the reset line for one or more slots included within the ISA bus, temporarily disabling those slots during normal operation of the data-processing system.

7 Claims, 6 Drawing Sheets

METHOD AND SYSTEM FOR SELECTIVE DISABLEMENT OF EXPANSION BUS SLOTS IN A MULTIBUS DATA PROCESSING SYSTEM

Background of the Invention

1. Technical Field

The present invention relates, in general, to an improved data-processing system and, in particular, to a method and system for eliminating peripheral device conflicts in a multibus data-processing system. Still more particularly, the present invention relates to a method and system for selectively disabling expansion slots associated with one bus in a multibus data-processing system.

2. Description of the Related Art

Modern data-processing systems utilize one or more sets of hardware lines for data transfer among the components of a computer system. The set of hardware lines is referred to as a "bus" and is essentially a shared highway that connects different parts of the system, including the microprocessor, disk-drive controller, memory and input/output ports and enables those devices to transfer information. A bus typically consists of specialized groups of lines that carry different types of information. One group of lines may carry data, while another group carries memory addresses where data items may be found. Still another group of lines within the bus may carry control signals. Buses are typically characterized by the number of bits that can be transferred at a single time. Most modern data-processing systems also contain one or more expansion slots into which additional peripheral devices may be plugged to connect those devices to the bus.

Many different types of bus configurations are known in the construction of data-processing systems. For example, the original personal computer, manufactured by International Business Machines Corporation, utilized a bus which supported eight bits at one time. Subsequent improvements to that bus created the so-called "AT" bus which supports 16 bits of data simultaneously.

More recently, the Industry Standard Architecture (ISA) bus design specification was promulgated which permits peripheral components to be added as cards plugged into standard expansion slots. Peripheral devices or expansion cards plugged into such slots must be configured to operate with the personal computer system. That is, memory locations, specific interrupt requests (IRQ) and various other specifications must be appropriately selected in order for a peripheral device plugged into an Industry Standard Architecture (ISA) bus in order to function properly.

Modern personal computers now often utilize the so-called Peripheral Component Interconnect (PCI) local bus. This specification was introduced by Intel Corporation and defines a local bus system that per to ten PCI-compliant expansion cards to be installed within a computer. A PCI local bus system requires the presence of a PCI controller card, which must be installed in one of the PCI-compliant slots. A PCI controller can exchange data with the system's central processor at either 32 bits or 64 bits simultaneously, dependent upon the particular implementation, and permits intelligent, PCI-compliant adapters to perform tasks concurrently with the central processor utilizing a technique called bus mastering. Additionally, devices which conform to the "Plug and Play" specification permit the computer to automatically configure itself to work properly with peripheral devices plugged into expansion slots which are attached to a PCI local bus.

Many current personal computers include both an ISA bus and a PCI bus. Industry experience has shown that customer support requests are often caused by resource conflicts or loss of functionality which occurs when an end-user improperly installs a peripheral device within an ISA slot, such as a modem, an audio card or multimedia devices. Such conflicts do not occur with a PCI bus as the automatic configuration resolves such conflicts at initiation.

Typically, systems may be shipped by the manufacturer including both ISA and PCI expansion slots because certain functions are only available for ISA expansion slots; however, there exists a large base of customers who do not use ISA expansion slots, and consequently, the ability to prevent an end-user from inserting peripheral devices within ISA expansion slots, thus eliminating possible resource conflicts, would be highly desirable.

Thus, those having skill in the art should appreciate that a method and system for selectively disabling expansion slots associated with an ISA bus could eliminate many customer support calls which are created as a result of resource conflicts.

Summary of the Invention

It is therefore one object of the present invention to provide an improved data-processing system.

It is another object of the present invention to provide an improved method and system for eliminating peripheral device conflicts in a multibus data-processing system.

It is yet another object of the present invention to provide an improved method and system for selectively disabling expansion slots associated with one bus in a multibus data-processing system.

The foregoing objects are achieved as is now described. The method and system of the present invention may be utilized to eliminate peripheral device conflicts in a multibus data-processing system which includes a Peripheral Component Interconnect (PCI) bus having multiple slots for interconnecting peripheral devices in an automatically derived configuration and an Industry Standard Architecture (ISA) bus having multiple slots for interconnecting peripheral devices in a user-selected configuration. Each slot included within the ISA bus includes a reset line for temporarily disabling an associated slot in response to an application of electrical power to the data-processing system, in order to prevent power transition problems. In response to an existing or potential peripheral device conflict brought about by a user-selected configuration, a control signal is selectively applied to the reset line for one or more slots included within the ISA bus, thus temporarily disabling those slots during normal operation of the data-processing system.

The above, as well as additional objectives, features and advantages of the present invention, will become apparent in the following detailed written description.

Brief Description of the Drawings

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Detailed Description of the Preferred Embodiment

Figure 1:
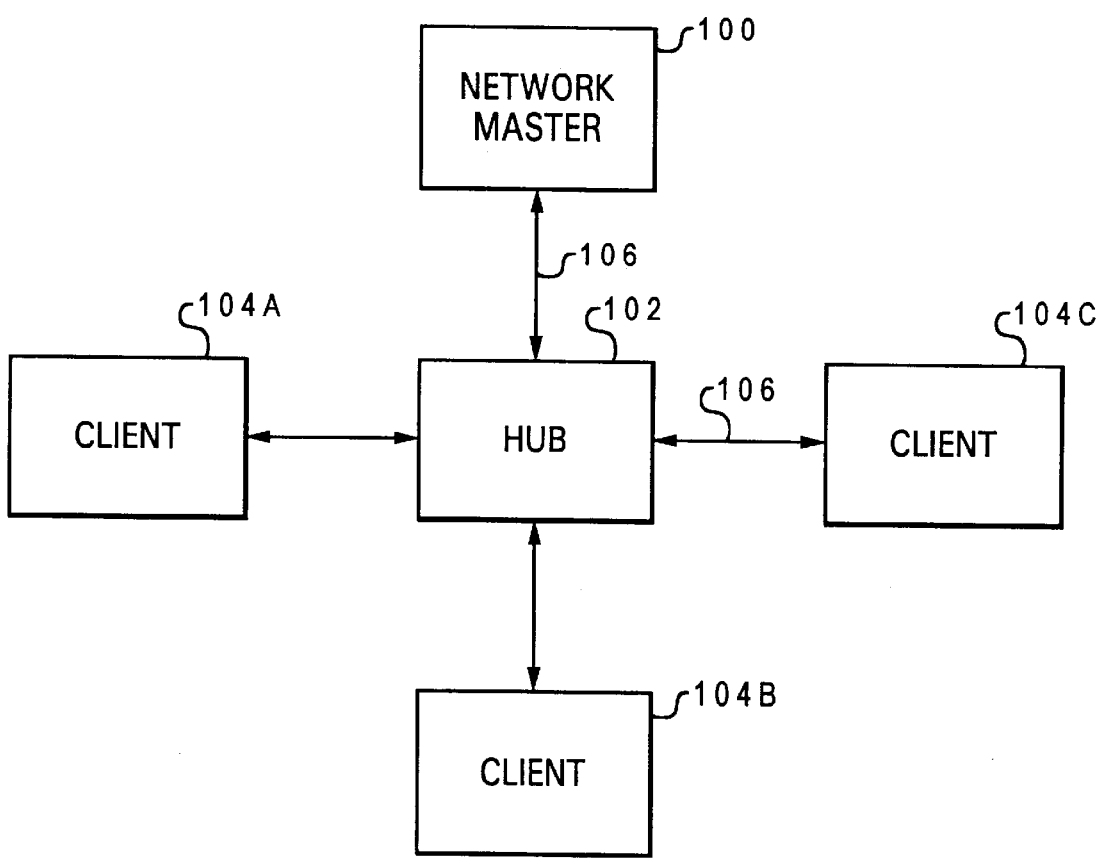
FIG. 1 is a high-level block diagram of a network which may be utilized to implement the method and system of the present invention.

With reference now to the figures and, in particular, with reference to FIG. 1, there is depicted a high-level block diagram of a network which may be utilized to implement the method and system of the present invention. As illustrated, a network master system 100 is depicted connected to a hub 102 by a LAN connector bus 106. Multiple client systems 104A, 104B and 104C also are connected to hub 102 via respective LAN connector buses 106. In a depicted embodiment of the present invention, the network illustrated within FIG. 1 conforms to the Ethernet specification and utilizes hubs common in such applications. It will be appreciated by those having skill in the art that other forms of network such as, for example, token ring, also may be utilized to implement the present invention.

Figure 2:
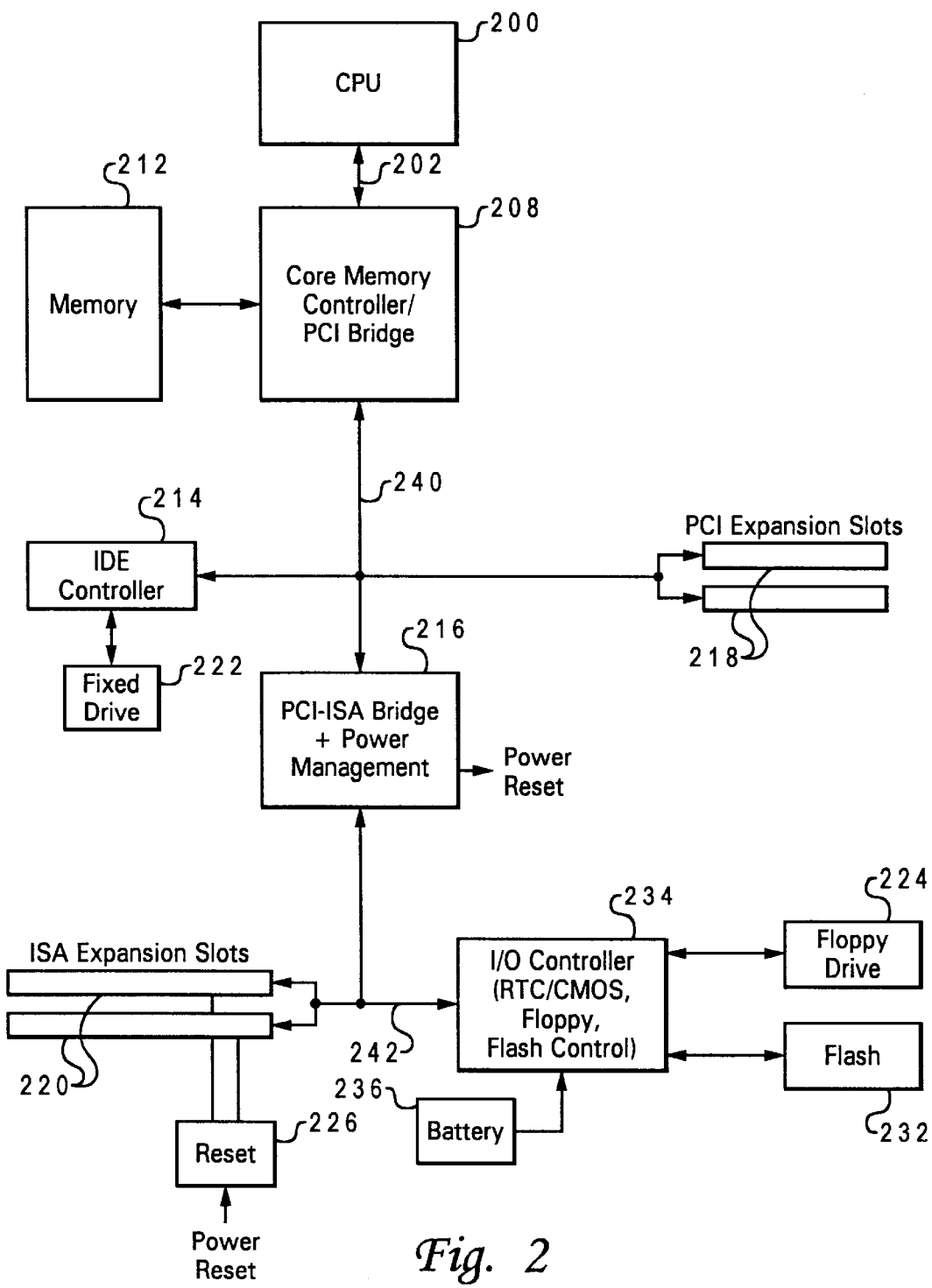
FIG. 2 is a high-level block diagram of a multibus client system which may be utilized within the network of FIG. 1.

Referring now to FIG. 2, there is depicted a high-level block diagram of a multibus client system which may be utilized within the network of FIG. 1. As illustrated, the multibus client system of FIG. 2 includes a central processing unit (CPU) 200 which is connected by address, control and data buses 202 to a memory controller and PCI bus bridge chip 208. System memory 212 also is connected to memory controller and PCI bus bridge 208.

An industry-standard peripheral component interconnect expansion bus 240 is depicted coupling memory controller and PCI bus bridge 208, IDE device controller 214, PCI connector slots 218 and a PCI bus to ISA bus bridge chip 216. As is common in such applications, PCI bus to ISA bus bridge 216 also includes power management logic.

The multibus data-processing system depicted in FIG. 2 also typically includes input devices and data storage devices such as fixed disk drive 222 and floppy disk drive 224. Fixed disk drive 222 is preferably connected to IDE controller 214 and floppy disk drive 224 is preferably connected to input/output controller 234 as depicted. Input/output controller 234 is connected to ISA bus 242 and preferably includes an interface for flash memory 232, which contains a microcode which will be executed by the multibus data-processing system depicted upon the application of electrical power.

As those skilled in the art will appreciate, flash memory 232 is preferably an electrically erasable programmable read-only memory (EEPROM) module and will include a BIOS (basic input/output system) which is utilized to interface between input/output devices and the operating system. Input/output controller 234 also includes low-voltage memory such as CMOS memory which may be utilized to store system configuration data. That is, data which describe the present configuration of the multibus data-processing system of FIG. 2. Such information may include a list of initial program load (IPL) devices set by a user and the sequence to be utilized for a particular power method, type of display, amount of memory, time, date, etc. Additionally, data stored within such low-voltage memory may include a special configuration program, such as a configuration/setup program which may be executed by the user of the multibus data-processing system depicted within FIG. 2. A battery 236 typically is provided in association with input/output controller 234 in order to provide power to the low-voltage memory contained therein, to prevent loss of configuration data.

A plurality of ISA expansion slots 220 also are depicted coupled to ISA bus 242. As noted, each ISA expansion slot 220 includes a dedicated reset line coupled to reset logic 226. When the reset line is active, any card or peripheral device within an ISA expansion slot 220 is disabled. The reset line is generated within the power management logic of ISA bus bridge Chip 216 and is active only on the initial application of electrical power and is released when electrical power has achieved normal operating conditions. In this manner, the activity of peripheral devices within ISA expansion slots 220 may be curtailed during the initial application of electrical power in order to prevent any problems which may occur as a result of power transition. As depicted, a power reset signal coupled to reset control 226 is utilized to disable each ISA expansion slot 220 upon the initial application of electrical power.

Figure 3:
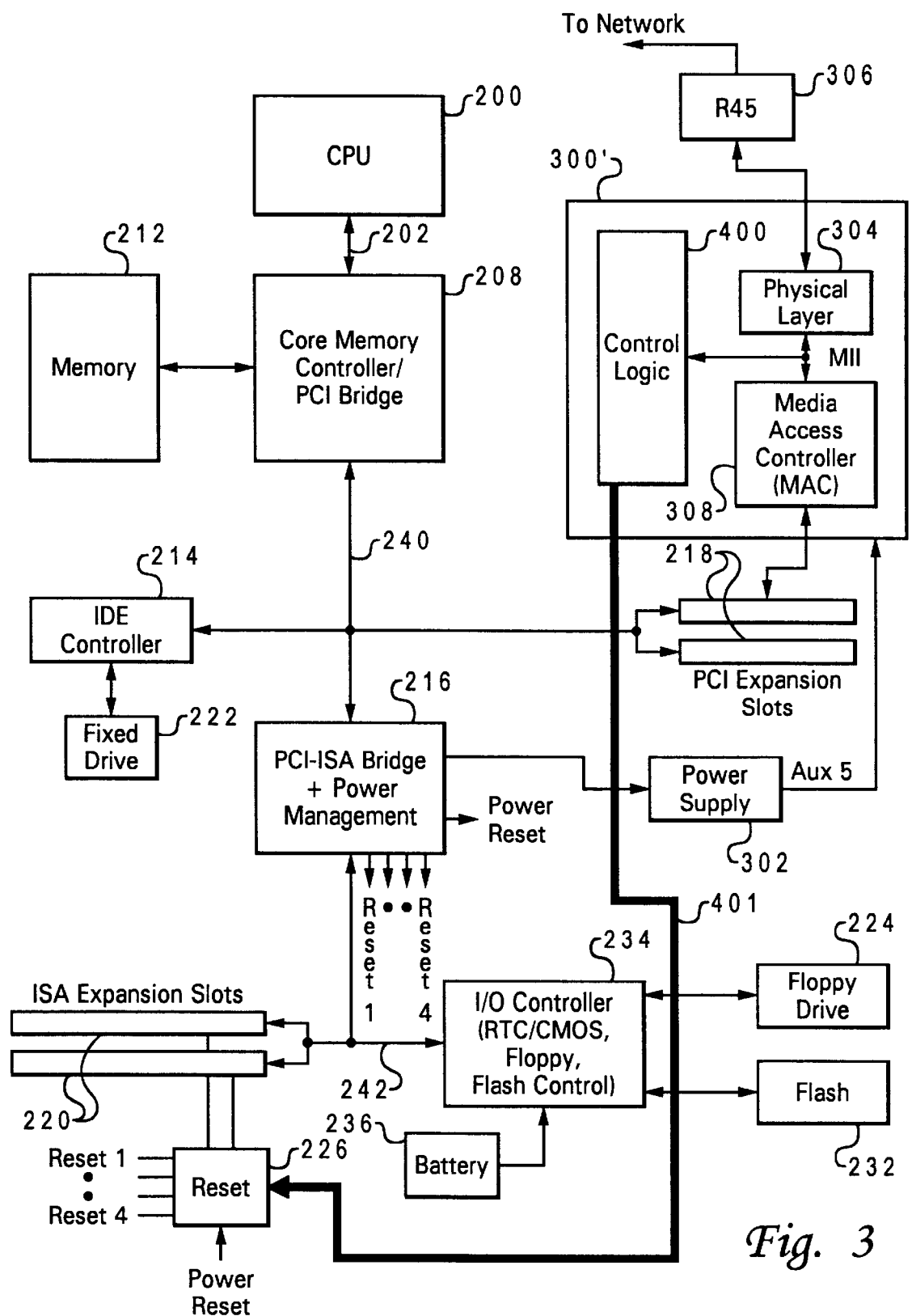
FIG. 3 is a high-level block diagram of the multibus client system of FIG. 2 with added network connection circuitry utilized to implement one embodiment of the method and system of the present invention.

With reference now to FIG. 3, there is depicted a high-level block diagram of the multibus data-processing system of FIG. 2 with added network connection circuitry which may be utilized to implement one embodiment of the method and system of the present invention. As depicted, each element of the multibus data-processing system other than the network connection circuitry is unchanged from FIG. 2 and like reference numerals are utilized for those elements.

As noted, a modified network adapter 300 is coupled to the multibus data-processing system via one PCI expansion slot 218. Contained within the modified network adapter 300 is control logic 400 which is connected to the bus which extends between physical layer 304 and Media Access Controller 308. Physical layer 304 is connected, via connector 306, to the network depicted within FIG. 1.

Control logic 400 may be implemented utilizing a "hardwired" Application-Specific Integrated Circuit (ASIC) or a programmed general-purpose processor, as described herein. By connecting control logic 400 at the bus between physical layer 304 and Media Access Controller (MAC) 308, control logic 400 may send and receive network packets utilizing physical layer 304. Control logic 400, in accordance with the method and system of the present invention, may accept data from physical layer 304 and provide control signals to the multibus data-processing system depicted in order to implement the method and system of the present invention.

As depicted, control signals from control logic 400 may be coupled to reset controller 226 and utilized, in a manner which will be explained in greater detail herein, to selectively create an active signal on the reset line for one or more ISA expansion slots 220. In this manner, one or more ISA expansion slots 220 may be selectively disabled in order to prevent peripheral device conflicts in applications wherein ISA expansion slots 220 are not utilized as specified by the system administrator of the network of FIG. 1. Of course, a power reset signal also may be generated by the power management logic of ISA bus bridge chip 216 as noted above. Additionally, individual reset signals also may be created via software routines or through general-purpose input/output pins.

Figure 4:
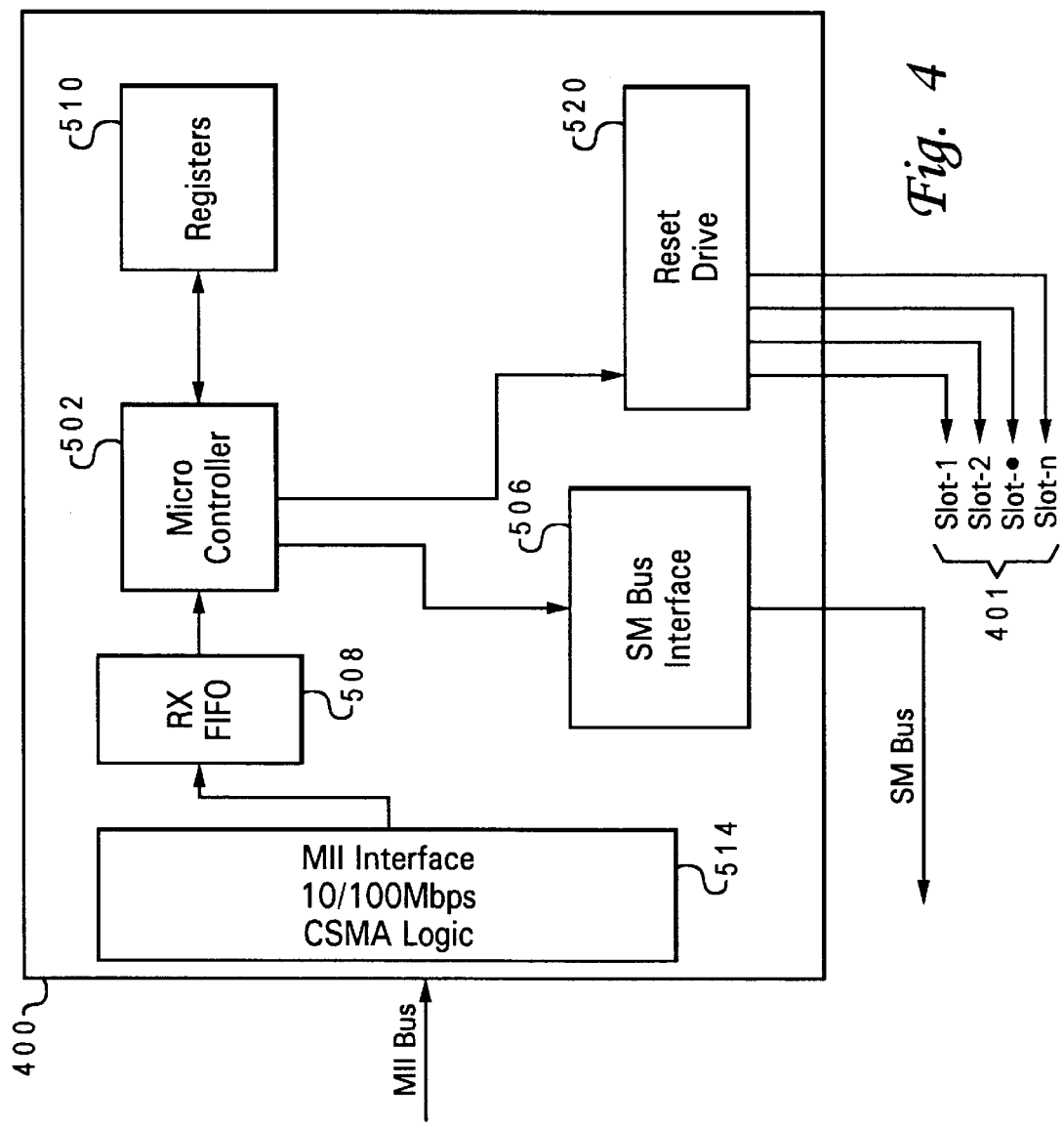
FIG. 4 is a high-level block diagram of a control logic circuit portion of the network connection circuitry of FIG. 3 which may be utilized to implement the method and system of the present invention.

Referring now to FIG. 4, there is depicted a high-level block diagram of the control logic portion of the network connection circuitry of FIG. 3 which may be utilized to implement the method and system of the present invention. As depicted, signals are received within control logic 400 from the bus which interconnects physical layer 304 and Media Access Controller 308 at interface unit 514. Interface unit 514 preferably is a carrier since the multiple access interface which implements a suitable network protocol so that data packets transmitted from the network may be received within the multibus data-processing system of FIG. 2. Signals thus received are passed to receive first-in/first-out buffer 508. Microcontroller 502 is utilized to coordinate the processing of that information in accordance with the method and system of the present invention, and when an appropriate network packet is received, that packet is processed by microcontroller 502 to update the status of expansion slots associated with the ISA bus. Data concerning the status of ISA expansion slots may be stored within register 510. A System Management (SM) bus interface 506 also is provided from control logic 400 to the multibus data-processing system so that the status of ISA expansion slots 220 and the content of registers of 510 may be accessed by the multibus data-processing system.

As depicted in FIG. 4, one output of microcontroller 502 is coupled to reset drive 520. Reset drive 520 provides a plurality of logic signals generally indicated at reference numeral 401 which are coupled to reset control 226 and utilized, in the manner described above, to selectively disable one or more ISA expansion slots 220 in accordance with the method and system of the present invention during normal operation of the data-processing system.

Thus, as those skilled in the art will appreciate upon reference to the foregoing, in a network system in which multibus data-processing systems are provided and wherein the System Administrator decrees that ISA expansion slots 220 will not be utilized, in order to avoid peripheral device conflicts, the method and system of the present invention provides a technique whereby a control signal may be generated and utilized to selectively disable one or more ISA expansion slots within the multibus data-processing system. This technique effectively prevents device conflicts since all peripheral devices plugged into PCI bus 240 are automatically configured and no conflict may occur.

Figure 5:
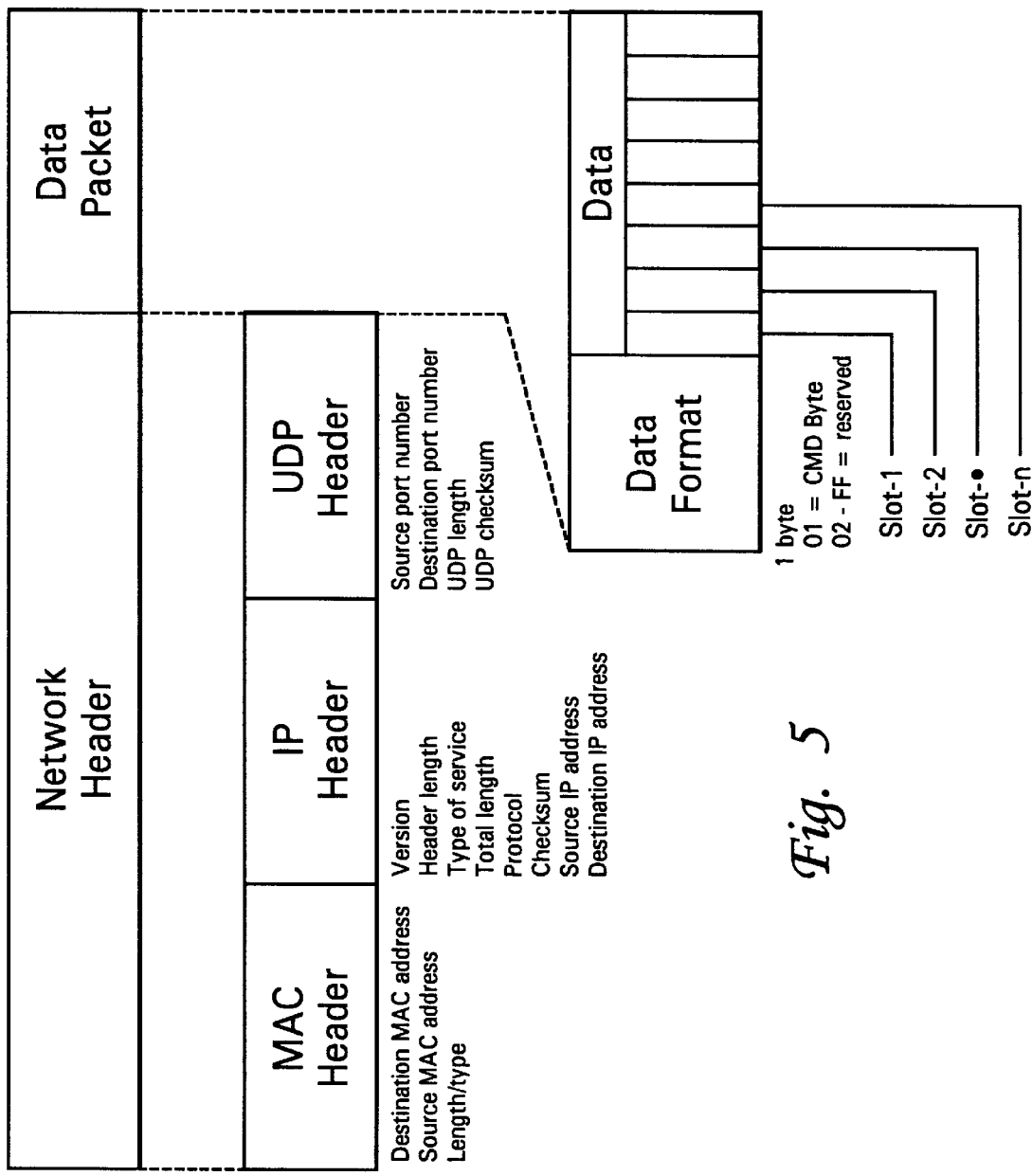
FIG. 5 is a schematic representation of a data packet which may be utilized to remotely control connector slots within the multibus client system of FIG. 2 in accordance with the method and system of the present invention.

With reference now to FIG. 5, there is depicted a schematic representation of data packet 600 which may be utilized to remotely control ISA expansion slots 220 in accordance with the method and system of the present invention. As depicted, packet 600 preferably includes a network header which may include a MAC header, an IP header and a UDP header, as is well-known in the art of network communications in order to provide addresses, identifiers and other information to ensure correct transfer of the packet. The data packet preferably also includes information content which is to be transferred. As illustrated within FIG. 5, the data packet preferably includes a data format and multiple bits of data. In the format depicted within FIG. 5, multiple data signals are provided which include the enable/disable status of each ISA expansion slot 220. This information, when processed by control logic 400, as described above with respect to FIG. 4, may be efficiently and effectively utilized to selectively disable one or more ISA expansion slots 220 (see FIG. 2) during normal operation of the multibus data-processing system.

Figure 6:
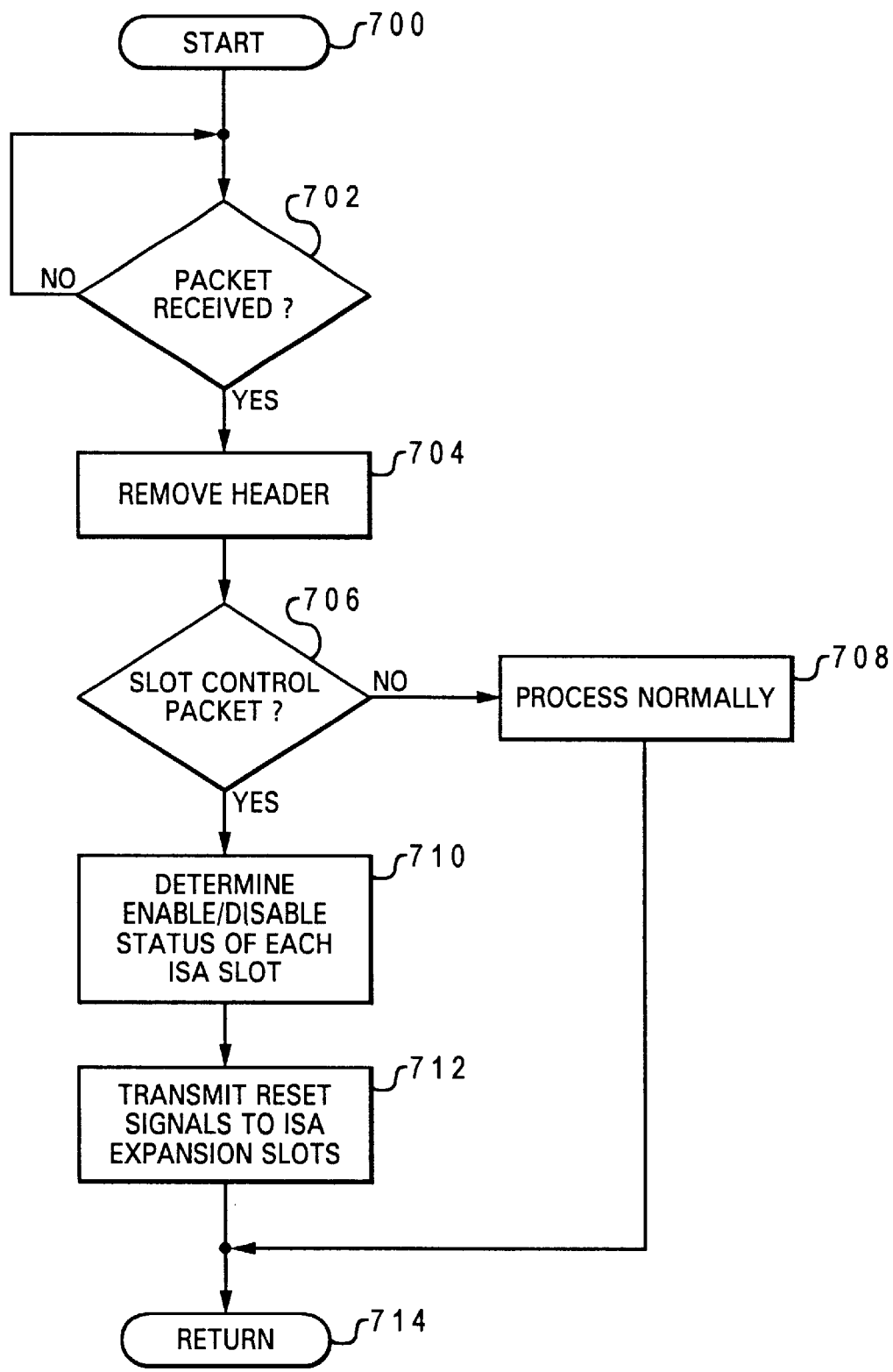
FIG. 6 is a high-level logic flowchart implementation of a process for implementing the method and system of the present invention.

Finally, referring to FIG. 6, there is depicted a high-level logic flowchart implementation of a process for implementing the method and system of the present invention. As depicted, the process begins at block 700 and passes thereafter to block 702. Block 702 depicts a determination of whether or not a packet has been received at control logic 400. If not, the process merely iterates until such time as a packet has been received.

Once a packet has been received, the process passes to block 704. Block 704 illustrates the removal of the header data, and thereafter, the process passes to block 706. Block 706 depicts a determination of whether or not the received packet is a slot-control packet, and if not, the process passes to block 708 where the data within the packet is processed normally.

Referring again to block 706, in the event the packet identified is a slot-control packet, the process passes to block 710. Block 710 depicts the determination of the enable/disable status of each ISA expansion slot within the multibus data-processing system. Thereafter, the process passes to block 712. Block 712 depicts the transmission of appropriate reset signals to each ISA expansion slot. The process then passes to block 714 and returns. Referring again to block 708, after normal processing of a non-slot-control packet, the process also passes to block 714 and returns.

On reference to the foregoing, those skilled in the art will appreciate that the applicants herein named have created a method and system whereby one or more expansion slots within a single bus in a multibus data-processing system may be selectively disabled during normal operation of the data-processing system in order to prevent peripheral device conflict and minimize the service calls associated with such problems.

What is claimed is:

1. A method for eliminating peripheral device conflicts in a data-processing system having a first bus which includes multiple slots for interconnecting peripheral devices in an automatically derived configuration and a second bus which includes multiple slots for interconnecting peripheral devices in a user-selected configuration, each of said multiple slots associated with said second bus including a reset line for temporarily disabling an associated slot in response to an application of electrical power to said data-processing system, said method comprising the steps of:

identifying a particular slot associated with said second bus, and selectively applying a control signal to said reset line associated with said particular slot during normal operation of said data-processing system to selectively disable said particular slot, said control signal to said reset line being generated by a control logic that is responsive to a signal from a network connected to said control logic, wherein said reset line is capable of selectively disabling said particular slot independently of an operating system of a processor associated with said particular slot.

2. The method for eliminating peripheral device conflicts in a data-processing system according to claim 1 further including the step of simultaneously applying a control signal to said reset line associated with every slot associated with said second bus wherein every slot associated with said second bus may be selectively disabled during normal operation of said data-processing system.

3. The method for eliminating peripheral device conflicts in a data-processing system according to claim 1 further including the step of selectively removing said control signal from said reset line associated with said particular slot in response to a user input.

4. A data-processing system comprising:

a central processing unit;

a memory coupled to said central processing unit;

a first bus coupled to said central processing unit, said first bus including multiple slots for interconnecting peripheral devices to said central processing unit in an automatically derived configuration;

a second bus coupled to said central processing unit; said second bus including multiple slots for interconnecting peripheral devices to said central processing unit in a user-selected configuration;

a reset line coupled to each slot associated with said second bus for temporarily disabling an associated slot in response to an application of electrical power to said data-processing system; and control logic for selectively applying a control signal to a reset line coupled to a particular slot associated with said second bus, said control signal to said reset line being generated by said control logic that is responsive to a signal from a network connected to said control logic, wherein said reset line is capable of selectively disabling said particular slot independently of an operating system of a processor associated with said particular slot.

5. The data-processing system according to claim 4 wherein said control logic further includes means for removing said control signal from reset line.

6. The data-processing system according to claim 4 wherein said first bus comprises a Peripheral Component Interconnect (PCI) bus.

7. The data-processing system according to claim 6 wherein said second bus comprises an Industry Standard Architecture (ISA) bus.

* * * * *